US006296942B1

(12) United States Patent
Eaton, Jr. et al.

(10) Patent No.: US 6,296,942 B1
(45) Date of Patent: Oct. 2, 2001

(54) SILICON BASED SUBSTRATE WITH CALCIUM ALUMINOSILICATE ENVIRONMENTAL/THERMAL BARRIER LAYER

(75) Inventors: Harry Edwin Eaton, Jr., Woodstock; William Patrick Allen, Portland, both of CT (US); Robert Alden Miller, Brecksville, OH (US); Nathan S. Jacobson, Westlake, OH (US); James L. Smialek, Strongsville, OH (US); Elizabeth J. Opila, Lakewood, OH (US); Kang N. Lee, Westlake, OH (US); Bangalore A. Nagaraj, West Chester, OH (US); Hongyu Wang; Peter Joel Meschter, both of Niskayuna, NY (US); Krishan Lal Luthra, Schenectady, NY (US)

(73) Assignees: General Electric Company, NY (US); United Technologies Corporation, DE (US); NASA, Washington, DC (US)

( * ) Notice: Subject to any disclaimer, the term of this patent is extended or adjusted under 35 U.S.C. 154(b) by 0 days.

(21) Appl. No.: 09/292,350

(22) Filed: Apr. 15, 1999

(51) Int. Cl.[7] .......... B32B 9/00

(52) U.S. Cl. .......... 428/446; 428/450; 428/472; 428/698

(58) Field of Search .......... 428/325, 446, 428/450, 469, 472, 472.2, 701, 702, 621, 629, 632, 633, 698, 384, 364

(56) References Cited

U.S. PATENT DOCUMENTS

| | | | |
|---|---|---|---|
| 4,713,302 * | 12/1987 | Gates et al. | 428/698 |
| 5,952,100 * | 9/1999 | Corman et al. | 428/384 |

* cited by examiner

*Primary Examiner*—Deborah Jones
*Assistant Examiner*—Bryant Young
(74) *Attorney, Agent, or Firm*—Bachman & LaPointe, P.C.

(57) ABSTRACT

A barrier layer for a silicon containing substrate which inhibits the formation of gaseous species of silicon when exposed to a high temperature aqueous environment comprises a calcium alumino silicate.

29 Claims, 2 Drawing Sheets

SILICON BASED SUBSTRATE WITH CALCIUM ALUMINOSILICATE ENVIRONMENTAL/THERMAL BARRIER LAYER

The invention described herein was made in the performance of work under NASA Contract No. NAS3-26385, and is subject to the provisions of Section 305 of the National Aeronautics and Space Act of 1958, as amended (42 U.S.C. 2457).

BACKGROUND OF THE INVENTION

The present invention relates to an article comprising a substrate containing silicon and a barrier layer which functions as a protective environmental/ thermal barrier coating and, more particularly, a barrier layer which inhibits the formation of gaseous species of Si, particularly $Si(OH)_x$ when the article is exposed to a high temperature, aqueous (water and/or steam) environment.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in aqueous environments. It has been found that these silicon containing substrates can recede and lose mass as a result of a formation volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 6 mils per 1000 hrs. It is believed that the process involves oxidation of the silicon carbide to form silica on the surface of the silicon carbide followed by reaction of the silica with steam to form volatile species of silicon such as $Si(OH)_x$. Naturally it would be highly desirable to provide a external barrier coating for silicon containing substrates which would inhibit the formation of volatile silicon species, $Si(OH)_x$ and SiO, and thereby reduce recession and mass loss.

Accordingly, it is the principle object of the present invention to provide an article comprising a silicon containing substrate with a barrier layer which inhibits the formation of gaseous species of Si, particularly $Si(OH)_x$, when the article is exposed to a high temperature, aqueous environment.

A second objective of this invention is to provide an article comprising a substrate with a barrier layer providing thermal protection, such layer closely matching the thermal expansion of the substrate.

It is a further object of the present invention to provide a method for producing an article as aforesaid.

SUMMARY OF THE INVENTION

The present invention relates to an article comprising a silicon containing substrate having a barrier layer on the substrate, wherein the barrier layer functions to both inhibit the formation of undesirable gaseous species of silicon when the article is exposed to a high temperature, aqueous environment and to provide thermal protection. By high temperatures is meant the temperature at which the Si in the substrate forms $Si(OH)_x$ and/or SiO in an aqueous environment. By aqueous environment is meant a water and/or steam environment. The silicon containing composite is preferably a ceramic or metal alloy containing silicon. The external barrier layer is characterized by a coefficient of thermal expansion which is within plus or minus 3.0 ppm per degree centigrade of the coefficient of expansion of the silicon containing substrate. The preferred barrier layer in accordance with the present invention is a calcium aluminosilicate barrier layer. In a preferred embodiment of the present invention the article can include one or more intermediate layers between the silicon based substrate and the barrier layer. The intermediate layer(s) serve(s) to provide enhanced adherence between the barrier layer and the substrate and/or to prevent reactions between the barrier layer and the substrate.

The invention further relates to a method for producing an article comprising a silicon containing substrate and a barrier layer which inhibits the formation of gaseous species of silicon and/or provides thermal protection when the article is exposed to a high temperature, aqueous environment as defined above.

Further objects and advantages of the present invention will appear hereinbelow from the following detailed description.

DETAILED DESCRIPTION

Figure 1:
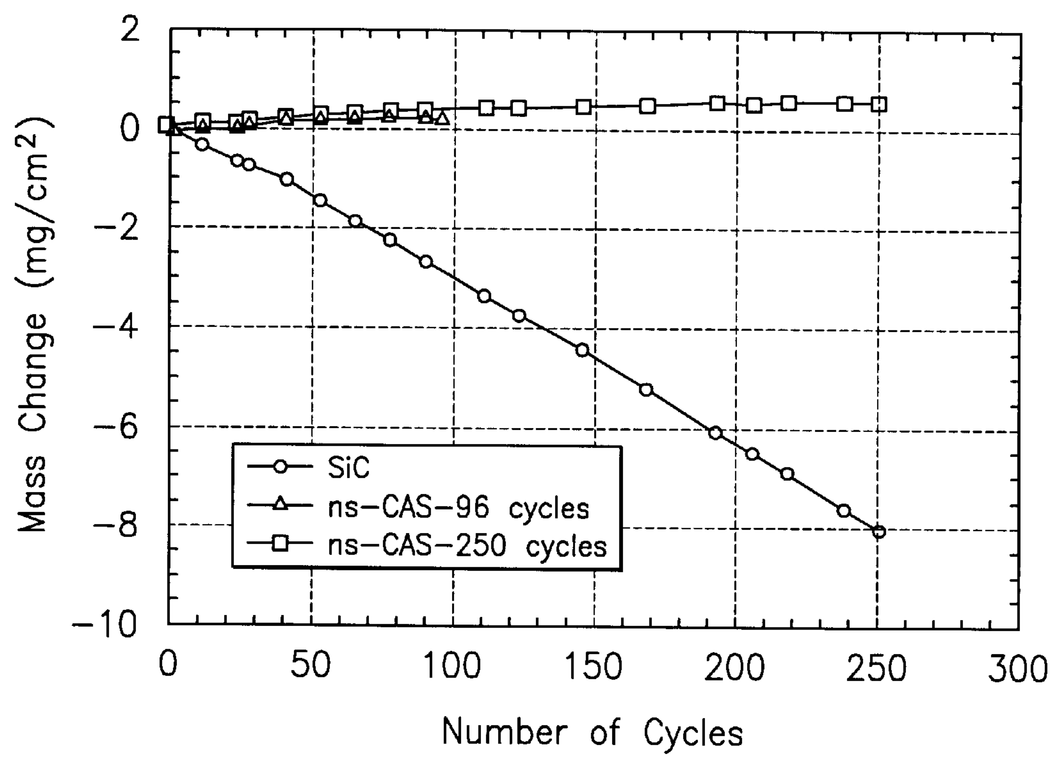
FIG. 1 is a graph showing the stability of the barrier layer of the present invention with respect to recession and mass loss.

The present invention relates to an article comprising a silicon substrate and a barrier layer, wherein the barrier layer inhibits the formation of gaseous species of silicon when the article is exposed to a high temperature, aqueous environment. The invention also relates to a method for producing the aforesaid article. In addition, it should be appreciated that while the barrier is particularly directed to an environmental barrier layer, the barrier layer also functions as a thermal barrier layer and thus the present invention broadly encompasses the use of environmental/ thermal barrier layers on silicon containing substrates and on substrates having comparable thermal expansion coefficients.

According to the present invention, the silicon containing substrate may be a silicon ceramic substrate or a silicon containing metal alloy. In a preferred embodiment, the silicon containing substrate is a silicon containing ceramic material as, for example, silicon carbide, silicon nitride, silicon carbon nitride, silicon oxynitride, and silicon aluminum oxynitride. In accordance with a particular embodiment of the present invention, the silicon containing ceramic substrate comprises a silicon containing matrix with reinforcing materials such as fibers, particles and the like and, more particularly, a silicon based matrix which is fiber-reinforced. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article of the present invention include molybdenum-silicon alloys, niobium-silicon alloys and iron-silicon alloys.

Barrier layers particularly useful in the article of the present invention include alkaline earth metal aluminosilicates. In accordance with a preferred embodiment, calcium aluminosilicates are preferred. In a particular embodiment, the barrier layer comprises greater than about 20% by weight CaO, greater than about 38% by weight $Al_2O_3$ and greater than about 30% by weight $SiO_2$. A particularly suitable barrier layer for use on silicon containing ceramic compositions in the article of the present invention comprises about 24% by weight Cao, about 40% by weight $Al_2O_3$, and about 36% by weight $SiO_2$. Non-stoichiometric calcium aluminosilicate is preferred.

It is an important feature of the present invention to maintain compatibility between the coefficient of thermal expansion of the silicon containing substrate and the barrier layer. In accordance with the present invention it has been found that the coefficient of thermal expansion of the barrier layer should be within ±3.0 ppm per degrees centigrade, preferably ±0.5 ppm per degrees centigrade, of the coefficient of thermal expansion of the silicon containing substrate. When using a silicon containing ceramic substrate such as a silicon carbide or a silicon nitride matrix with or without reinforcing fibers as described above in combination with the preferred calcium aluminosilicate barrier layer of the present invention, the desired thermal compatibility with respect to expansion coefficient between the silicon containing substrate and the barrier layer should be ±2.00 ppm per degrees centigrade.

The barrier layer should be present in the article at a thickness of greater than or equal to about 0.5 mils (0.0005 inch), preferably between about 3 to about 30 mils and ideally between about 3 to about 5 mils. The barrier layer may be applied to the silicon containing substrate by any suitable manner known in the art, however, it is preferable that the barrier layer be applied by thermal spraying as will be described hereinbelow.

In a further embodiment of the article of the present invention, an intermediate layer can be provided between the silicon containing substrate and the barrier layer. The intermediate layer(s) serve(s) to provide enhanced adhesion between the barrier layer and the substrate and/or to prevent reactions between the barrier layer and the substrate. The intermediate layer consists of, for example, $SiO_2$, mullite, mullite-barium strontium aluminosilicate, mullite-yttrium silicate, mullite-calcium aluminosilicate, and silicon metal. Mullite has been found to be a particularly useful intermediate layer; however, mullite by itself tends to be cracked as the result of thermal spraying fabrication processing. Accordingly, it is preferred that the barrier layer comprises mullite-barium strontium aluminosilicate, mullite-yttrium silicate, or mullite-calcium aluminosilicate in an amount of between about 40 to 80 wt. % mullite and between about 20 to 60 wt. % barium strontium aluminosilicate or yttrium silicate or calcium aluminosilicate. The thickness of the intermediate layer is typical to those described above with regard to the barrier layer and the intermediate layer may likewise be disposed in any manner known in the prior art, however, preferably by thermal spraying as described hereinbelow.

In addition to the intermediate layer, a bond layer may be provided between the silicon containing substrate and the intermediate layer. A suitable bond layer includes silicon metal in a thickness of 3 to 6 mils. Alternatively, the silicon based substrate may be pre-oxidized to provide a $SiO_2$ bond layer prior to application of the intermediate layer.

The method of the present invention comprises providing a silicon containing substrate and applying a barrier layer wherein the barrier layer inhibits the formation of gaseous species of silicon when the article is exposed to a high temperature, aqueous environment. In accordance with the present invention it is preferred that the barrier layer be applied by thermal spraying. It has been found that the barrier layer should be thermal sprayed at a temperature of between about 870° C. to 1200° C. in order to help equilibrate as-sprayed, splat quenched, microstructure and to provide a means to manage stresses which control delamination.

The silicon containing substrate should be cleaned prior to application of the barrier layer to remove substrate fabrication contamination. It is preferred that the silicon based substrate be subjected to a grit blasting step prior to application of the barrier layer. The grit blasting step must be carried out carefully in order to avoid damage to the surface of the silicon-containing substrate such as silicon carbide fiber reinforced composite. It has been found that the particles used for the grit blasting should be hard enough to remove the undesired contamination but not as hard as the substrate material to prevent erosive removal of the substrate. Further, the particles must be small to prevent impact damage to the substrate. When processing an article comprising a silicon carbide ceramic substrate, it has been found that the grit blasting should be carried out with $Al_2O_3$ particles, preferably of a particle size of $\leqq 30$ microns and, preferably, at a velocity of about 150 to 200 m/sec. In addition to the foregoing, it may be particularly useful to preoxidize the silicon based substrate prior to application of the intermediate and/or barrier layer in order to improve adherence. It has been found that bond layers of between 100 nanometers to 2000 nanometers are preferred. $SiO_2$ bond layers of the desired thickness can be achieved by preoxidizing the silicon-carbide substrate at a temperature of between 800° C. to 1200° C. for about 15 minutes to 100 hours.

The silicon bond layer may be applied directly to the grit blasted surface by thermal spraying at approximately 870° C. to a thickness of 3 to 6 mils.

Intermediate layers may be applied between the substrate and/or bond layer and the barrier layer or between the bond layer and barrier layer by thermal spraying in the same manner described above with respect to the barrier layer. As noted above, the preferred intermediate layers include mullite, mullite-barium strontium aluminosilicate, mullite-yttrium silicate, and mullite-calcium aluminosilicate.

After application of the desired layers to the silicon-based substrate material, the article is subjected to a heat treatment step in order to provide stress relief to the thermal sprayed structure, and to promote bonding between the sprayed powder particles and between the layers and the substrate. Broadly, the heat treatment step requires a controlled heating of the article over time in a manner which allows for crystallization of the calcium aluminosilicate without swelling and/or formation of pores by the barrier layer. Preferably, the article is heated from room temperature to a temperature of between about 1275° C. to about 1300° C. at a rate of between about 5° C./minute to about 10° C./minute and held at intermediate temperatures wherein the total treatment time is greater than or equal to 68 hours. Specifically, for a barrier layer which comprises non-stoichiometric calcium aluminosilicate, the following heat treatment has been found to be particularly useful for obtaining a non-swelled, substantially porous free barrier layer.

a) room temperature to 700° C. @ 10° C./min, hold 4 hrs.
b) 700° C. to 800° C. @ 10° C./min, hold 8 hrs.
c) 800° C. to 900° C. @ 10° C./min, hold 16 hrs.
d) 900° C. to 1000° C. @ 10° C./min, hold 16 hrs.

e) 1000° C. to 1100° C. @ 10° C./min, hold 8 hrs.

f) 1100° C. to 1200° C. @ 10° C./min, hold 8 hrs.

g) 1200° C. to 1225° C. @ 5° C./min, hold 2 hrs.

h) 1225° C. to 1250° C. @ 5° C./min, hold 2 hrs.

i) 1250° C. to 1275° C. @ 5° C./min, hold 2 hrs.

j) 1275° C. to 1300° C. @ 5° C./min, hold 2 hrs.

k) furnace cool to room temperature.

The advantages of the article of the present invention will become clear from consideration of the following example.

EXAMPLE 1

Hot pressed bulk coupons of non-stoichiometric calcium aluminosilicate (ns-CAS) of composition 24% CaO, 40% $Al_2O_3$ and 36% $SiO_2$ by weight were fabricated via hot pressing in Argon at 1400° C. for 2 hours and then submitted for high steam thermal cycle testing at 1200° C. for up to 250 thermal cycles in comparison to silicon carbide. The results show that the silicon carbide loses up to 8 mg/cm$^2$ weight during the testing while the ns-CAS does not. See FIG. 1.

EXAMPLE 2

Figure 2:
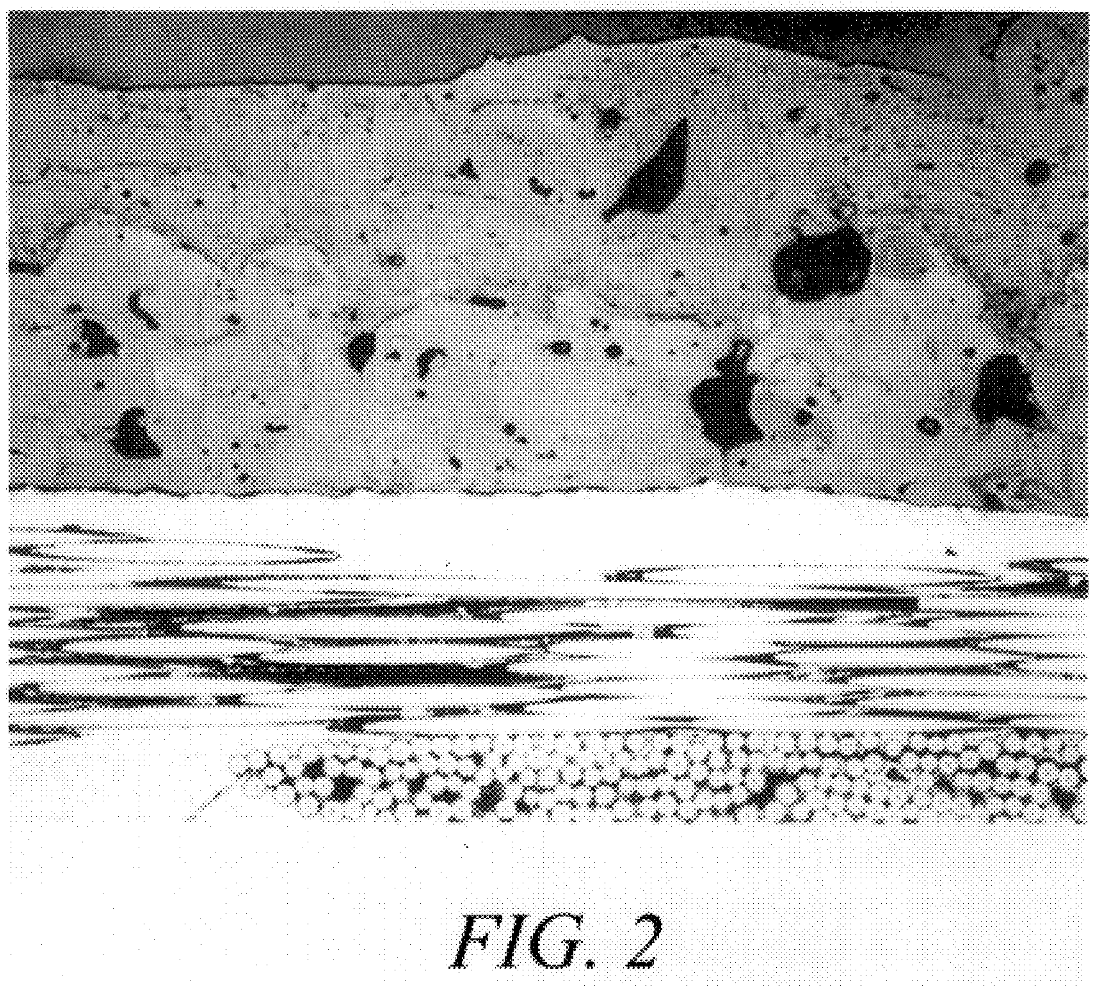
FIG. 2 is a photomicrograph through a sample of the barrier layer of the present invention on a silicon carbide substrate.

FIG. 2 is a cross section of a 4 mil thick ns-CAS coating on 4 mils of mullite on SiC composite. The ns-CAS and mullite were thermal sprayed onto the silicon carbide composite using the following parameters:

| Parameter | Setting | |
|---|---|---|
| plasma torch | Metco 3M | |
| nozzle | GH | |
| anode | std. | |
| powder port | metco #2 | |
| primary gas | Ar @ 80 Metco gage | |
| secondary gas | H2 @ 8 Metco gage | |
| substrate temp. | 850° C. | |
| carrier gas | Ar @ 37 Metco gage | |
| powder feed | 15 to 25 gpm | |
| | intermed. | surface |
| power | 30 kw | 25 kw |
| stand-off | 2.5–3" | 5" |

Prior to coating the substrate was cleaned by grit blasting with 27 micron alumina particles at an impact velocity of 150 to 200 mps. The ns-CAS powder was obtained from Specialty Glass as a free flowing −200+400 mesh powder. The mullite was Cerac Mullite (Aluminum Oxide—Silicon Oxide), −150, +325 mesh, Cerac # A-1226. As can be seen from FIG. 2, the invention results in an excellent barrier layer structure.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An article comprising:

a substrate comprising silicon; and a yttrium containing gaseous species of Si formation inhibiting barrier layer, wherein the barrier layer inhibits the formation of gaseous species of Si when the article is exposed to a high temperature, aqueous environment.

2. An article according to claim 1 wherein the substrate is selected from the group consisting of silicon containing ceramic and metal alloys containing silicon.

3. An article according to claim 2 wherein the substrate is a silicon containing ceramic selected from the group consisting of silicon carbide, silicon nitride, silicon oxynitride, and silicon aluminum oxynitride.

4. An article according to claim 2 wherein the substrate is a composite comprising a silicon based matrix and a reinforcing particle.

5. An article according to claim 4 wherein said substrate is selected from the group consisting of silicon carbide fiber-reinforced silicon carbide matrix, carbon fiber-reinforced silicon carbide matrix and silicon carbide fiber-reinforced silicon nitride.

6. An article according to claim 2 wherein said substrate is a silicon containing metal alloy selected from the group consisting of molybdenum-silicon alloys, niobium silicon alloys, iron-silicon alloys, and iron-nickel-silicon based alloys.

7. An article according to claim 1 wherein the barrier layer comprises calcium oxide.

8. An article according to claim 1 wherein the barrier layer comprises a calcium aluminosilicate.

9. An article according to claim 1 wherein the barrier layer comprises greater than about 20% by weight CaO, greater than about 38% by weight $Al_2O_3$ and greater than about 30% by weight $SiO_2$.

10. An article according to claim 1 wherein the barrier layer comprises about 24% by weight CaO, about 40% by weight $Al_2O_3$ and about 36% by weight $SiO_2$.

11. An article according to claim 1 wherein the coefficient of thermal expansion of the barrier layer is within ±3.0 ppm/° C. the coefficient of thermal expansion of the substrate.

12. An article according to claim 1 wherein the coefficient of thermal expansion of the barrier layer is within ±0.5 ppm/° C. the coefficient of thermal expansion of the substrate.

13. An article according to claim 1 wherein the barrier layer has a thickness of ≧0.5 mils (0.0005 inch).

14. An article according to claim 1 including an intermediate layer between the substrate and the barrier layer.

15. An article according to claim 14 wherein said intermediate layer is selected from the group consisting of $SiO_2$, mullite, mullite-barium strontium aluminosilicate, mullite-yttrium silicate, mullite-calcium aluminosilicate, and silicon metal.

16. An article according to claim 14 wherein said intermediate layer is selected from the group consisting of mullite, barium strontium aluminosilicate, mullite-yttrium silicate, calcium aluminosilicate and mixtures thereof.

17. An article according to claim 14 wherein said intermediate layer comprises mullite.

18. An article according to claim 14 wherein said intermediate layer comprises from about 40 to 80 wt. % mullite and from about 60 to 20 wt. % barium strontium aluminosilicate.

19. An article according to claim 14 wherein said intermediate layer comprises from about 40 to 80 wt. % mullite and from about 60 to 20 wt. % yttrium silicate.

20. An article according to claim 14 wherein said intermediate layer comprises from about 40 to 80 wt. % mullite and from about 60 to 20 wt. % calcium aluminosilicate.

21. An article according to claim 14 including a bond layer between the substrate and the intermediate layer.

22. An article according to claim 14 wherein the bond layer is silicon metal or $SiO_2$.

23. An article according to claim 14 wherein the intermediate layer has a thickness of ≧0.5 mils (0.0005 inch).

24. An article according to claim 9 wherein the barrier layer has a thickness of between about 3 to 30 mils.

25. An article according to claim 9 wherein the barrier layer has a thickness of between about 3 to 5 mils.

26. An article according to claim 14 wherein the intermediate layer has a thickness of 3 to 30 mils.

27. An article according to claim 14 wherein the intermediate layer has a thickness of 3 to 5 mils.

28. An article according to claim 21 wherein the bond layer has a thickness of between about 3 to 6 mils.

29.An article according to claim 1 wherein the barrier layer has a thickness of between 3–5 mils.

* * * * *

UNITED STATES PATENT AND TRADEMARK OFFICE

CERTIFICATE OF CORRECTION

PATENT NO. : 6,296,942 B1
DATED : October 2, 2001
INVENTOR(S) : Harry E. Eaton, Jr. et al.

It is certified that error appears in the above-identified patent and that said Letters Patent is hereby corrected as shown below:

<u>Column 3,</u>
Line 7, correct “Cao” to read -- CaO --.

<u>Column 4,</u>
Line 24, correct “≦ microns” to read -- ≤ microns --.

<u>Column 5,</u>
Line 63, correct “yttrium” to read -- calcium --.

Signed and Sealed this

Eighth Day of October, 2002

*Attest:*

JAMES E. ROGAN

*Attesting Officer* *Director of the United States Patent and Trademark Office*